(12) United States Patent
Ota et al.

(10) Patent No.: US 10,408,338 B2
(45) Date of Patent: Sep. 10, 2019

(54) CONTROL APPARATUS AND CONTROL METHOD FOR AUTOMATIC TRANSMISSION

(71) Applicant: TOYOTA JIDOSHA KABUSHIKI KAISHA, Toyota-shi, Aichi-ken (JP)

(72) Inventors: Keisuke Ota, Toyota (JP); Norihiro Tsukamoto, Toyota (JP); Masami Kondo, Niwa-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 9 days.

(21) Appl. No.: 15/903,668

(22) Filed: Feb. 23, 2018

(65) Prior Publication Data

US 2018/0245684 A1    Aug. 30, 2018

(30) Foreign Application Priority Data

Feb. 27, 2017   (JP) ................. 2017-034748

(51) Int. Cl.
| | |
|---|---|
| *F16H 59/18* | (2006.01) |
| *F16H 59/24* | (2006.01) |
| *F16H 61/02* | (2006.01) |
| *F02D 41/02* | (2006.01) |
| *F16H 59/70* | (2006.01) |

(Continued)

(52) U.S. Cl.
CPC ............ *F16H 59/24* (2013.01); *B60W 10/06* (2013.01); *B60W 30/19* (2013.01); *F02D 41/023* (2013.01); *F02D 45/00* (2013.01); *F16H 59/70* (2013.01); *F16H 61/029* (2013.01); *F16H 61/08* (2013.01); *F16H 63/502* (2013.01); *B60W 2030/18081* (2013.01); *B60W 2510/0657* (2013.01); *B60W 2540/10* (2013.01); *B60W 2710/1038* (2013.01); *F16H 2306/20* (2013.01); *F16H 2306/24* (2013.01)

(58) Field of Classification Search
CPC .......... F16H 59/18; F16H 59/20; F16H 59/24; F16H 2061/0087; F16H 61/04; F16H 61/08; F16H 61/10; F16H 61/12; F16H 61/16; F16H 61/18; F16H 63/502; F16H 2306/24; B60W 30/19; B60W 2540/10
See application file for complete search history.

(56) References Cited

U.S. PATENT DOCUMENTS

| | | | |
|---|---|---|---|
| 2002/0087246 A1 | 7/2002 | Kim | |
| 2011/0015033 A1* | 1/2011 | Nonomura | ........ F16H 61/66259 477/37 |
| 2011/0093173 A1* | 4/2011 | Ideshio | ............... F16H 61/0213 701/55 |

FOREIGN PATENT DOCUMENTS

| | | |
|---|---|---|
| JP | 2001-124193 A | 5/2001 |
| JP | 2016-161023 A | 9/2016 |

* cited by examiner

*Primary Examiner* — Edwin A Young
(74) *Attorney, Agent, or Firm* — Oliff PLC

(57) ABSTRACT

A control apparatus for a stepped automatic transmission in which one of a plurality of shift speeds is established by selectively engaging a plurality of frictional engagement elements, the stepped automatic transmission mounted on a vehicle, the control apparatus includes: an electronic control unit configured to perform a control of prohibiting a plurality of shift that is transitioning from an upshift speed change to a downshift speed change, for a predetermined period, when a downshift speed change requirement is requested by an occurrence of an accelerator depression operation during an inertia phase of the upshift speed change in a driven state of a vehicle.

4 Claims, 9 Drawing Sheets

(51) Int. Cl.
*F16H 63/50* (2006.01)
*B60W 10/06* (2006.01)
*F02D 45/00* (2006.01)
*B60W 30/19* (2012.01)
*F16H 61/08* (2006.01)
*B60W 30/18* (2012.01)

FIG. 3

|  | C1 | C2 | C3 | C4 | B1 | B2 |
|---|---|---|---|---|---|---|
| 1st | O |  |  |  |  | O |
| 2nd | O |  |  |  | O |  |
| 3rd | O |  | O |  |  |  |
| 4th | O |  |  | O |  |  |
| 5th | O | O |  |  |  |  |
| 6th |  | O |  | O |  |  |
| 7th |  | O | O |  |  |  |
| 8th |  | O |  |  | O |  |
| Rev |  |  | O |  |  | O |

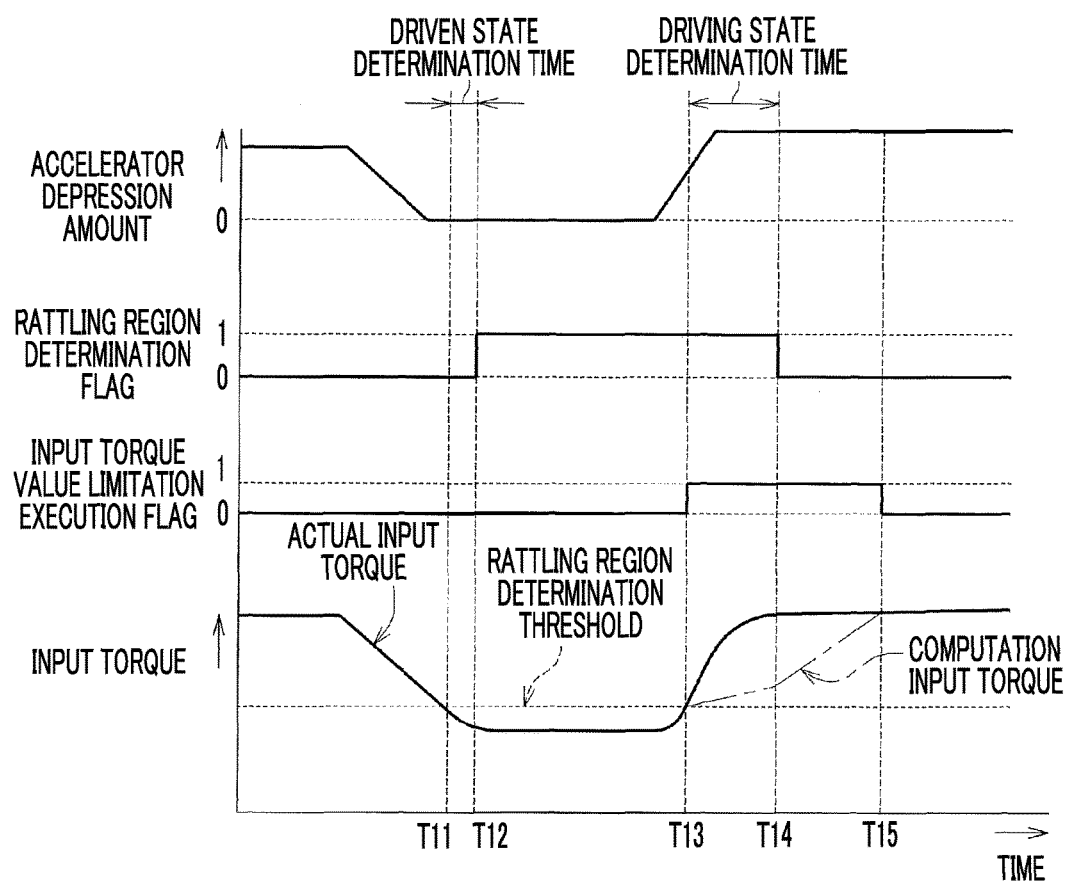

CONTROL APPARATUS AND CONTROL METHOD FOR AUTOMATIC TRANSMISSION

INCORPORATION BY REFERENCE

The disclosure of Japanese Patent Application No. 2017-034748 filed on Feb. 27, 2017 including the specification, drawings and abstract is incorporated herein by reference in its entirety.

BACKGROUND

1. Technical Field

The disclosure relates to a control apparatus and control method for an automatic transmission. In particular, the disclosure relates to shift control in a stepped automatic transmission.

2. Description of Related Art

Conventionally, there is known a control apparatus and control method for an automatic transmission in which one of a plurality of shift speeds is established by selectively engaging a plurality of frictional engagement elements.

For example, Japanese Patent Application Publication No. 2001-124193 (JP 2001-124193 A) discloses that a plurality of shift determination means for determining that a command for a downshift speed change has been issued during an upshift speed change, and shift start timing determination means for determining whether or not a difference between a rotational speed of an input shaft at a time point when this determination on the downshift speed change is made and a synchronous rotational speed of the input shaft after the downshift speed change has reached a state enabling appropriate performance of the downshift speed change are provided, and that start of the downshift speed change is delayed in accordance with a result of this determination. Thus, an engine is restrained from racing due to a situation where feedback control cannot be performed in time because the difference between the input shaft rotational speed and the synchronous rotational speed at a target shift speed (hereinafter referred to as a required shift speed) after the downshift speed change is too low.

SUMMARY

However, according to the control disclosed in the foregoing Japanese Patent Application Publication No. 2001-124193 (JP 2001-124193 A), in the case where the torque input to an automatic transmission is low at a timing when the delayed downshift speed change is started, the input shaft rotational speed cannot be swiftly raised to the synchronous rotational speed at the required shift speed of this downshift speed change, and it may become difficult to progress the downshift speed change.

In view of this, the inventors of the disclosure have achieved the disclosure by focusing attention on the fact that the downshift speed change can be smoothly progressed if this downshift speed change is started at the time point when the torque input to the automatic transmission becomes sufficiently high in the case where a downshift speed change requirement is created during the upshift speed change.

The disclosure is a control apparatus for an automatic transmission that makes it possible to smoothly progress a downshift speed change afterward when a downshift speed change requirement is created in a situation where an upshift speed change is performed in a driven state of a vehicle.

An example aspect of the present disclosure is a control apparatus for a stepped automatic transmission in which one of a plurality of shift speeds is established by selectively engaging a plurality of frictional engagement elements. The stepped automatic transmission is mounted on a vehicle. The control apparatus includes: an electronic control unit configured to perform a control of prohibiting a plurality of shift that is transitioning from an upshift speed change to a downshift speed change, for a predetermined period, when a downshift speed change requirement is requested by an occurrence of an accelerator depression operation during an inertia phase of the upshift speed change in a driven state of a vehicle. An example aspect of the present disclosure is a control method for a control apparatus for a stepped automatic transmission in which one of a plurality of shift speeds is established by selectively engaging a plurality of frictional engagement elements. The control apparatus includes an electronic control unit. The control method includes: i) determining, by the electronic control unit, whether or not a shift requirement is an upshift requirement; ii) determining, by the electronic control unit, whether or not a current upshift speed change is performed in a shift state during an inertia phase; and iii) performing, by the electronic control unit, a control of prohibiting a plurality of shift that is transitioning from an upshift speed change to a downshift speed change, for a predetermined period, when a downshift speed change requirement is requested by an occurrence of an accelerator depression operation during an inertia phase of the upshift speed change in a driven state of a vehicle.

Due to this matter to define the disclosure, when the downshift speed change requirement is created through the performance of the accelerator depression operation during the inertia phase of the upshift speed change in the driven state of the vehicle, the plurality of shift (a transition from the upshift speed change to the downshift speed change) is prohibited for the predetermined period. During the predetermined period in which the plurality of shift is thus prohibited, the torque input to the automatic transmission rises as a result of the accelerator depression operation. The downshift speed change is started at a time point when this input torque becomes sufficiently high. Therefore, the input shaft rotational speed can be swiftly raised to the synchronous rotational speed at the required shift speed of the downshift speed change, and the downshift speed change can be smoothly progressed.

The electronic control unit may be configured to execute a smoothing process such that a climb gradient of a target driving force of the automatic transmission when a shift operation is performed while a driving state of the vehicle transitioning from the driven state of the vehicle to the driving state of the vehicle is smaller than a climb gradient of a target driving force of the automatic transmission when the same shift operation is performed while a driving state of the vehicle maintains the driving state of the vehicle.

This makes it possible to alleviate a rattling shock resulting from the shortening of a play (e.g., a backlash between gears) in a motive power transmission system in the opposite direction, when a changeover from the driven state of the vehicle to the driving state of the vehicle is made.

The predetermined period may be a period to lapse of a predetermined time from a time point when the accelerator depression operation is performed.

An end of the predetermined period may be a timing when a torque input to the automatic transmission becomes equal to or higher than a predetermined value through the accelerator depression operation.

This setting of the predetermined period makes it possible to ensure that the downshift speed change is started at the time point when the input torque becomes sufficiently high, and smoothly progress the downshift speed change.

In the disclosure, when the accelerator depression operation is performed during the inertia phase of the upshift speed change in the driven state of the vehicle, the plurality of shift for making a transition from the upshift speed change to the downshift speed change is prohibited for the predetermined period. Thus, the downshift speed change is started at the time point when the input torque becomes sufficiently high. As a result, the downshift speed change can be smoothly progressed.

BRIEF DESCRIPTION OF THE DRAWINGS

Features, advantages, and technical and industrial significance of an exemplary embodiment of the disclosure will be described below with reference to the accompanying drawings, in which like numerals denote like elements, and wherein:

FIG. 3 is an engagement chart showing engagement states of first to fourth clutches and first and second brakes for each shift speed in the automatic transmission;

FIG. 9 is a timing chart showing changes in the accelerator depression amount, a rattling region determination flag, an input torque value limitation execution flag, and the input torque in the case where target driving force smoothing control is performed.

DETAILED DESCRIPTION OF EMBODIMENT

The embodiment of the disclosure will be described hereinafter based on the drawings.

First of all, a vehicle 100 according to the present embodiment of the disclosure will be described with reference to FIGS. 1 to 4.

Figure 1:
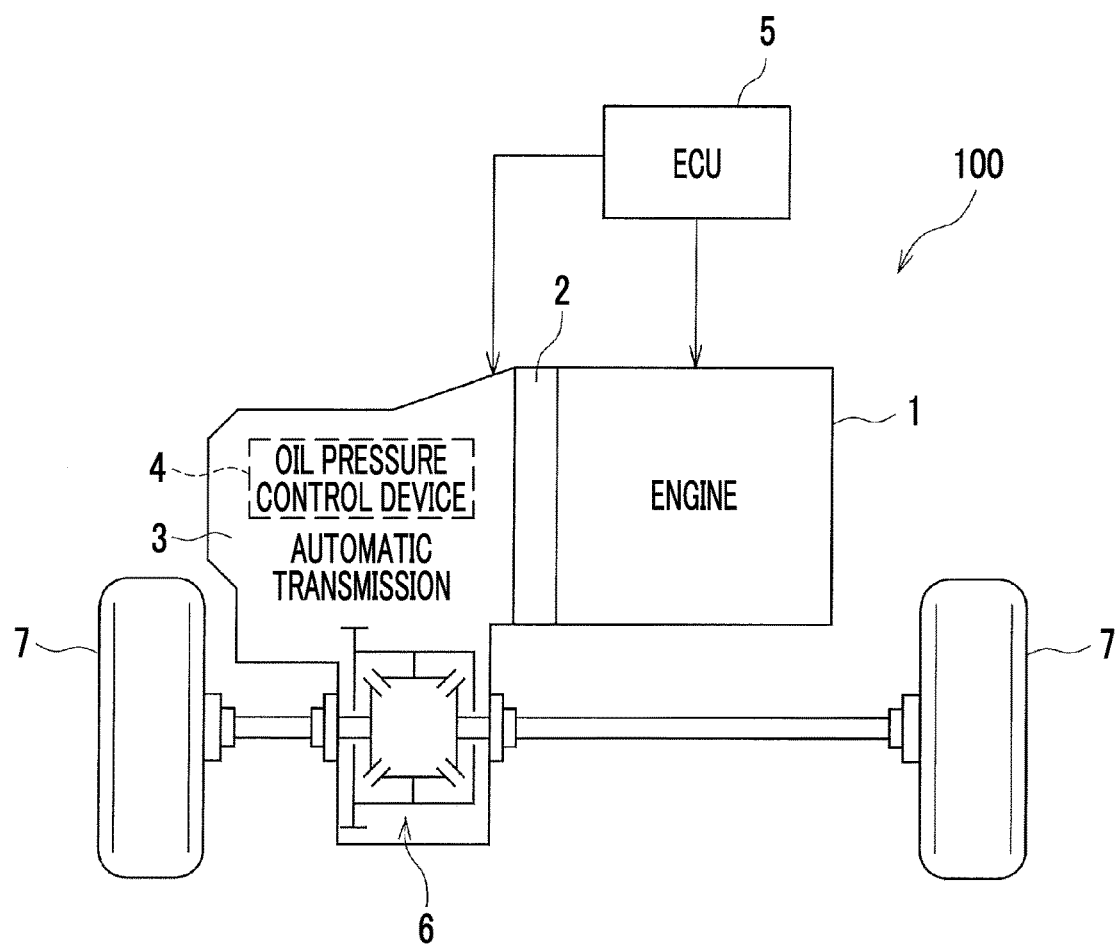
FIG. 1 is a view showing the general configuration of a drive system of a vehicle according to the embodiment of the disclosure.

As shown in FIG. 1, the vehicle 100 is equipped with an engine 1, a torque converter 2, a stepped automatic transmission 3, an oil pressure control device 4, and an electronic control unit (ECU) 5. This vehicle 100 is, for example, a front-engine front-drive (FF) vehicle. In this vehicle 100, an output of the engine 1 is transmitted to a differential device 6 via the torque converter 2 and the automatic transmission 3, and is distributed to right and left driving wheels (front wheels) 7.

The engine (the internal combustion engine) 1 is a driving force source for running, for example, a multi-cylinder gasoline engine. The engine 1 is configured such that the operating state thereof can be controlled by a throttle opening degree of a throttle valve (an intake air amount), a fuel injection amount, an ignition timing, and the like.

Figure 2:
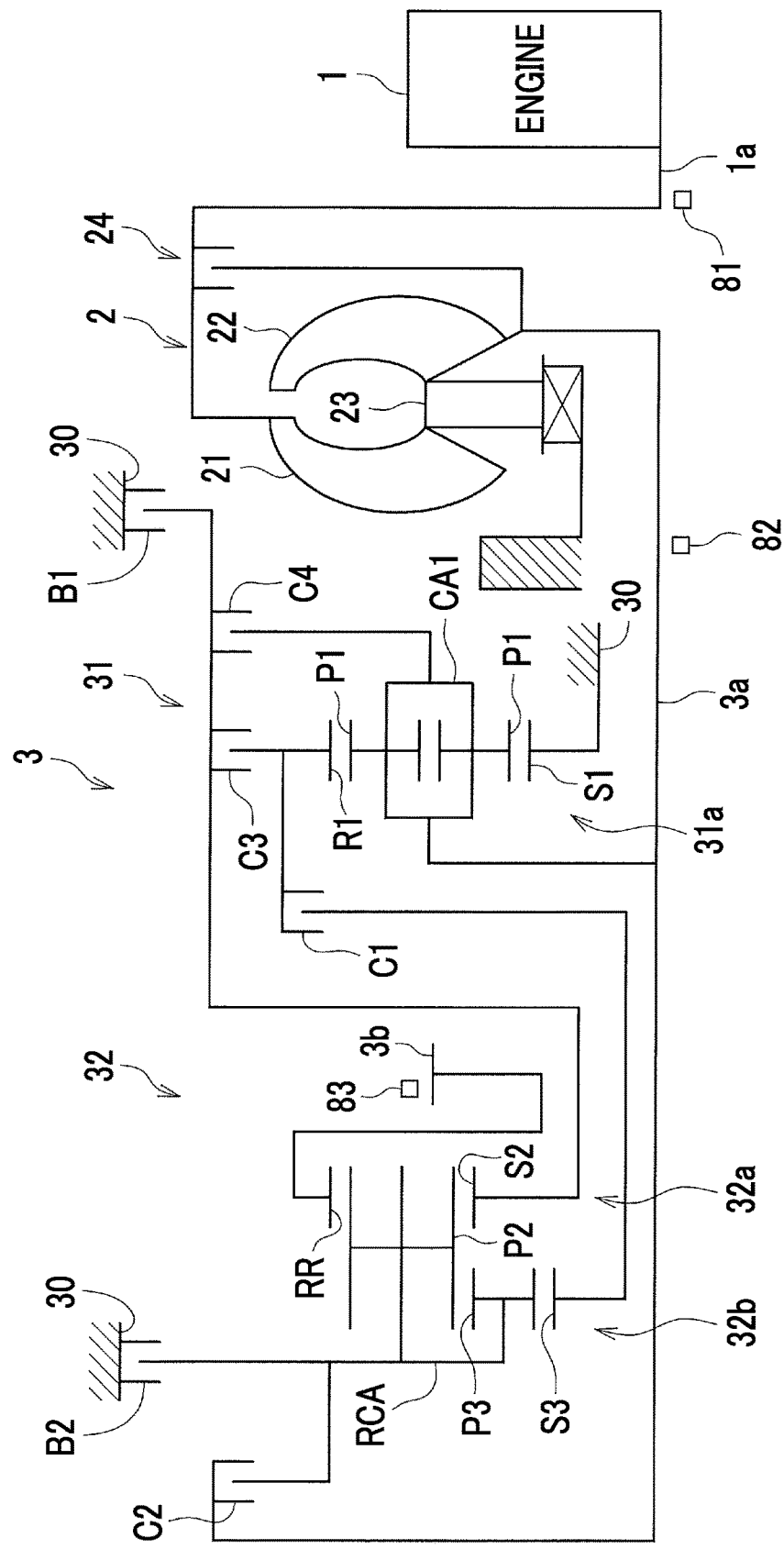
FIG. 2 is a skeleton diagram showing the configuration of a torque converter and an automatic transmission.

As shown in FIG. 2, the torque converter 2 includes a pump impeller 21 that is coupled to a crankshaft 1a as an output shaft of the engine 1, a turbine runner 22 that is coupled to the automatic transmission 3, a stator 23 having a torque amplification function, and a lockup clutch 24 for directly coupling the engine 1 and the automatic transmission 3 to each other. Incidentally, FIG. 2 schematically shows only upper halves of the torque converter 2 and the automatic transmission 3 above a rotational center axis, with lower halves thereof below the rotational center axis omitted.

The automatic transmission 3 is provided in a motive power transmission path between the engine 1 and the driving wheels 7, and is configured to change the speed of rotation of an input shaft 3a and output this rotation to an output shaft 3b. In this automatic transmission 3, the input shaft 3a is coupled to the turbine runner 22 of the torque converter 2, and the output shaft 3b is coupled to the driving wheels 7 via the differential device 6 and the like.

The automatic transmission 3 is configured to include a first shift unit (a front planetary unit) 31 that is mainly constituted by a first planetary gear device 31a, a second shift unit (a rear planetary unit) 32 that is mainly constituted by a second planetary gear device 32a and a third planetary gear device 32b, first to fourth clutches C1 to C4, first and second brakes B1 and B2, and the like.

The first planetary gear device 31a constituting the first shift unit 31 is a double pinion-type planetary gear mechanism, and is equipped with a sun gear S1, a plurality of pairs of pinion gears P1 that mesh with each other respectively, a planetary carrier CA1 that supports these pinion gears P1 such that the pinion gears P1 can rotate around their own axes and around the planetary carrier CA1, and a ring gear R1 that meshes with the sun gear S1 via the pinion gears P1.

The planetary carrier CA1 is coupled to the input shaft 3a, and rotates integrally with the input shaft 3a. The sun gear S1 is fixed to a transmission case 30, and cannot rotate. The ring gear R1 functions as an intermediate output member, and is decelerated with respect to the input shaft 3a. The rotation of the ring gear R1 thus decelerated is transmitted to the second shift unit 32.

The second planetary gear device 32a constituting the second shift unit 32 is a single pinion-type planetary gear mechanism, and is equipped with a sun gear S2, a pinion gear P2, a planetary carrier RCA that supports the pinion gear P2 such that the pinion gear P2 can rotate around its own axis and around the planetary carrier RCA, and a ring gear RR that meshes with the sun gear S2 via the pinion gear P2.

Besides, the third planetary gear device 32b constituting the second shift unit 32 is a double pinion-type planetary gear mechanism, and is equipped with a sun gear S3, a plurality of pairs of pinion gears P2 and P3 that mesh with each other respectively, the planetary carrier RCA that supports the pinion gears P2 and P3 such that the pinion gears P2 and P3 can rotate around their own axes and around the planetary carrier RCA, and the ring gear RR that meshes with the sun gear S3 via the pinion gears P2 and P3.

Incidentally, the planetary carrier RCA and the ring gear RR are shared by the second planetary gear device 32a and the third planetary gear device 32b.

The sun gear S2 is selectively coupled to the transmission case 30 by the first brake B1. Besides, the sun gear S2 is selectively coupled to the ring gear R1 via the third clutch C3. Furthermore, the sun gear S2 is selectively coupled to the planetary carrier CA1 via the fourth clutch C4. The sun gear S3 is selectively coupled to the ring gear R1 via the first clutch C1. The planetary carrier RCA is selectively coupled to the transmission case 30 by the second brake B2. Besides, the planetary carrier RCA is selectively coupled to the input shaft 3a via the second clutch C2. The ring gear RR is coupled to the output shaft 3b, and rotates integrally with the output shaft 3b.

The first to fourth clutches C1 to C4 and the first and second brakes B1 and B2 are all frictional engagement elements that are frictionally engaged by hydraulic actuators, and are controlled by the oil pressure control device 4 and the ECU 5.

FIG. 3 is an engagement chart showing engagement states or release states of the first to fourth clutches C1 to C4 and the first and second brakes B1 and B2 for each shift speed (each gear stage). Incidentally, in the engagement chart of FIG. 3, each circle indicates "an engagement state", and each blank indicates "a release state".

As shown in FIG. 3, in the automatic transmission 3 of this example, a first shift speed (1st) with a maximum speed ratio (the rotational speed of the input shaft 3a/the rotational speed of the output shaft 3b) is established through engagement of the first clutch C1 and the second brake B2. A second shift speed (2nd) is established through engagement of the first clutch C1 and the first brake B1. A third shift speed (3rd) is established through engagement of the first clutch C1 and the third clutch C3. A fourth shift speed (4th) is established through engagement of the first clutch C1 and the fourth clutch C4. A fifth shift speed (5th) is established through engagement of the first clutch C1 and the second clutch C2. A sixth shift speed (6th) is established through engagement of the second clutch C2 and the fourth clutch C4. A seventh shift speed (7th) is established through engagement of the second clutch C2 and the third clutch C3. An eighth shift speed (8th) is established through engagement of the second clutch C2 and the first brake B1. Incidentally, a backward shift speed (Rev) is established through engagement of the third clutch C3 and the second brake B2.

As described hitherto, the automatic transmission 3 is configured to establish one of the plurality of the shift speeds by selectively engaging the plurality of the frictional engagement elements.

The oil pressure control device 4 is provided to control the states (the engagement states or the release states) of the frictional engagement elements of the automatic transmission 3. Incidentally, the oil pressure control device 4 also has the function of controlling the lockup clutch 24 of the torque converter 2.

Figure 4:
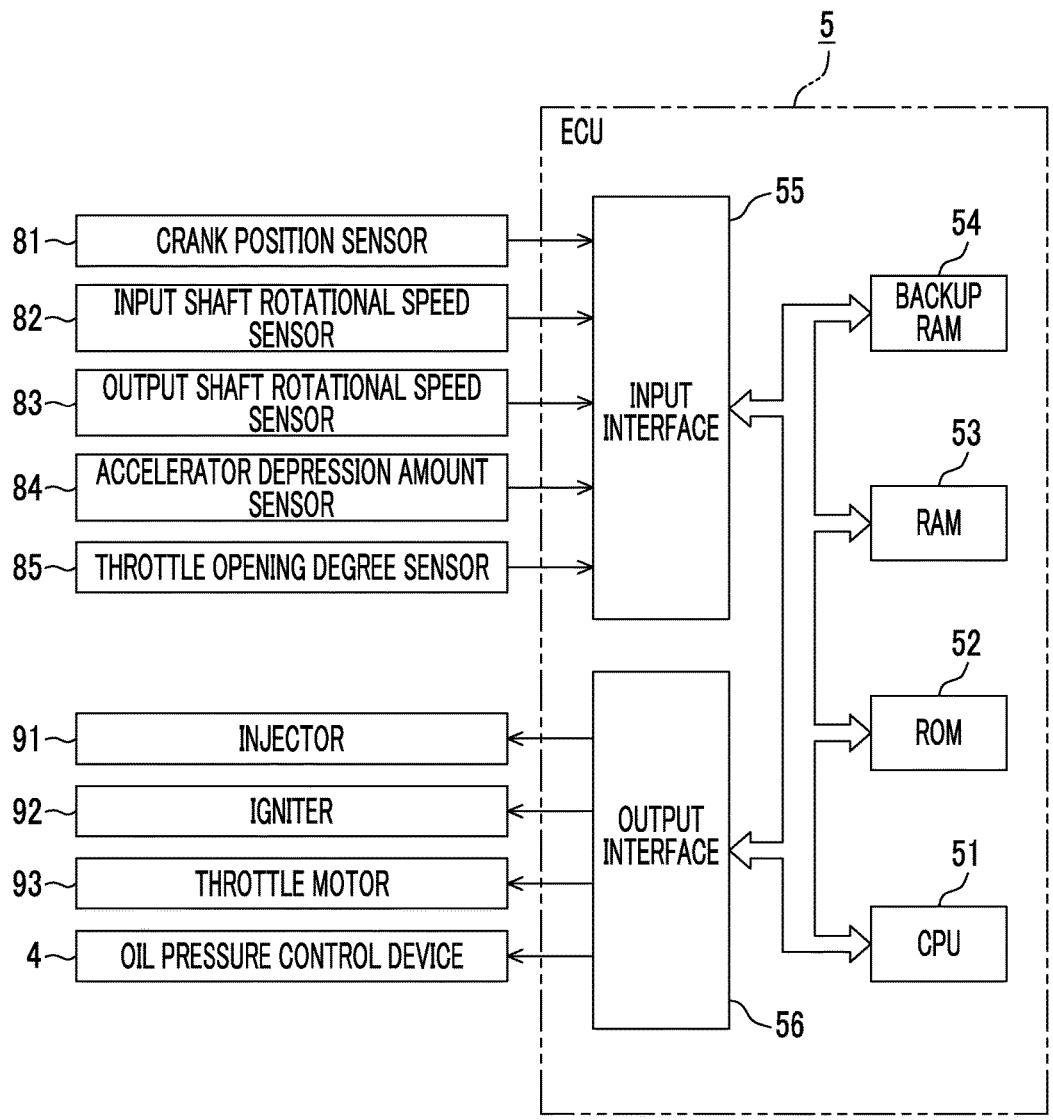
FIG. 4 is a block diagram showing the configuration of a control system of the vehicle.

The ECU 5 is configured to perform operation control of the engine 1, shift control of the automatic transmission 3, and the like. In concrete terms, as shown in FIG. 4, the ECU 5 includes a CPU 51, a ROM 52, a RAM 53, a backup RAM 54, an input interface 55, and an output interface 56. Incidentally, the ECU 5 is an example of "the control apparatus" according to the disclosure.

The CPU 51 executes a computation process based on various control programs and maps stored in the ROM 52. The various control programs, the maps that are referred to in executing the various control programs, and the like are stored in the ROM 52. The RAM 53 is a memory that temporarily stores a computation result of the CPU 51, detection results of respective sensors, and the like. The backup RAM 54 is a non-volatile memory that stores data and the like to be saved in turning off an ignition switch.

A crank position sensor 81, an input shaft rotational speed sensor 82, an output shaft rotational speed sensor 83, an accelerator depression amount sensor 84, a throttle opening degree sensor 85, and the like are connected to the input interface 55.

The crank position sensor 81 is provided to calculate a rotational speed of the engine 1. The input shaft rotational speed sensor 82 is provided to calculate a rotational speed of the input shaft 3a of the automatic transmission 3 (an input shaft rotational speed; a turbine rotational speed). The output shaft rotational speed sensor 83 is provided to calculate a rotational speed of the output shaft 3b of the automatic transmission 3 (an output shaft rotational speed). Incidentally, a vehicle speed can be calculated from the output shaft rotational speed. The accelerator depression amount sensor 84 is provided to detect an accelerator depression amount as a depression amount (an operation amount) of an accelerator pedal. The throttle opening degree sensor 85 is provided to detect a throttle opening degree of the throttle valve.

An injector 91, an igniter 92, a throttle motor 93, the oil pressure control device 4 and the like are connected to the output interface 56. The injector 91 is a fuel injection valve, and can adjust the amount of fuel injection. The igniter 92 is provided to adjust the timing of ignition by an ignition plug. The throttle motor 93 is provided to adjust the throttle opening degree of the throttle valve.

Then, the ECU 5 is configured to be able to control the operating state of the engine 1, by controlling the throttle opening degree, the fuel injection amount, the ignition timing and the like, based on detection results and the like of the respective sensors. Besides, the ECU 5 is configured to be able to perform shift control of the automatic transmission 3 and the control of the lockup clutch 24 of the torque converter 2, by controlling the oil pressure control device 4.

In shift control performed by the ECU 5, a required shift speed is set based on, for example, a shift map using the vehicle speed and the accelerator depression amount as parameters, and the oil pressure control device 4 is controlled such that the actual shift speed becomes equal to the required shift speed.

Prior to the description of the control characterizing the present embodiment of the disclosure (a plurality of shift prohibition control), the outline of shift control for determining control operation amounts for realizing shift target values in the foregoing automatic transmission 3 will be described.

In the present embodiment of the disclosure, as shift control, a method of performing a shift through the use of a shift model that determines the control operation amounts for realizing the shift target values is adopted, instead of a method using a general control map. The shift target values are target values of elements that determine a shift mode that is desired to be realized at the time of a shift (e.g., a shift time, a driving force, or the like). The control operation amounts are required values of elements that operate controlled objects (an engine torque, a clutch torque, and the like).

Shift control performed through the use of the shift model will be described hereinafter. Equations of motion during a shift are expressed as equations (1) and (2) shown below.

$$d\omega t/dt = a1 \cdot Tt + b1 \cdot Tcapl + c1 \cdot Tcdrn + d1 \cdot d\omega o/dt \quad (1)$$

$$To = a2 \cdot Tt + b2 \cdot Tcapl + c2 \cdot Tcdrn + d2 \cdot d\omega o/dt \quad (2)$$

These equations (1) and (2) are derived from equations of motion of respective rotary elements that constitute the automatic transmission 3 and that are coupled to one another, and a relational expression in the planetary gear devices constituting the automatic transmission 3. The equation of motion of each of the rotary elements is an equation of motion that prescribes a torque expressed as the product of an inertia and a rotational speed time change rate in each of the rotary elements as a torque that acts on three members of the planetary gear devices and that one of members located on both sides of a frictional engagement element which is relevant to each of the rotary elements. Besides, the relational expression in the planetary gear devices is a relational expression that prescribes a relationship in torque among the three members of the planetary gear devices and a relationship in rotational speed time change rate among the three members of the planetary gear devices, through the use of gear ratios of the planetary gear devices.

In each of the equations (1) and (2), $d\omega t/dt$ is a time differentiation, namely, a time change rate of a turbine rotational speed (a rotational angular velocity) $\omega t$ (i.e., an input shaft rotational speed $\omega i$), and denotes an acceleration (an angular acceleration, which will be referred to hereinafter as an input shaft acceleration) of the input shaft 3a as an amount of change in the speed of the rotary member on the input shaft 3a side. Besides, $d\omega o/dt$ is a time change rate of an output shaft rotational speed $\omega o$, and denotes an output shaft acceleration. Tt denotes a turbine torque, that is, a torque on the input shaft 3a as a torque on the rotary member on the input shaft 3a side, namely, a transmission input torque Ti. This turbine torque Tt is synonymous with an engine torque Te (=Tt/t) when a torque ratio t of the torque converter 2 is taken into account. To denotes a transmission output torque, that is, a torque on the output shaft 3b as a torque on the rotary member on the output shaft 3b side. Tcapl is a torque capacity of the frictional engagement element that performs engagement operation at the time of a shift (hereinafter referred to as an engagement-side clutch torque). Tcdrn is a torque capacity of the frictional engagement element that performs release operation at the time of a shift (hereinafter referred to as a release-side clutch torque). Besides, a1, a2, b1, b2, c1, c2, d1, and d2 are constants that are used when the equations (1) and (2) are derived, and are coefficients that are determined from the inertia of each of the rotary elements and the gear ratios of the planetary gear devices from the standpoint of design. The concrete values of these constants differ depending on, for example, the type of a shift (e.g., a shift pattern or combinations of shift speeds before and after a shift). Accordingly, although the foregoing motions of equation are definite, equations of motion corresponding to the type of a shift in which the constants differ depending on the type of the shift are used for the shift of the automatic transmission 3.

The foregoing equations of motion (1) and (2) are equations of motion of a gear train of the automatic transmission 3 in which a relationship between the shift target values and the control operation amounts is formulated. The shift target values can express a target value of the shift time and a target value of the driving force, and can be handled in the equations of motion of the gear train. In the present embodiment of the disclosure, the input shaft acceleration $d\omega t/dt$ is used as an exemplary physical quantity that can express the shift time. Besides, the transmission output torque To is used as an exemplary physical quantity that can express the driving force. That is, in the present embodiment of the disclosure, the shift target values are set using two values, namely, the input shaft acceleration $d\omega t/dt$ and the transmission output torque To.

On the other hand, in the present embodiment of the disclosure, the control operation amounts for achieving the shift target values are set using three values, namely, the turbine torque Tt (which is synonymous with the engine torque Te), the engagement-side clutch torque Tcapl, and the release-side clutch torque Tcdrn. Then, while the equations of motion are constituted as two equations, namely, the foregoing equations (1) and (2), there are three control operation amounts. Therefore, a unique solution to the control operation amounts for achieving the two shift target values cannot be found. Incidentally, the output shaft acceleration $d\omega o/dt$ is calculated from the output shaft rotational speed $\omega o$ as a detection value of the output shaft rotational speed sensor 83.

Thus, in the present embodiment of the disclosure, a torque sharing ratio of the transmitted torque that is taken charge of by the release-side clutch and the engagement-side clutch is used, as a condition of constraint that is suited to express and control the delivery of a torque during a shift and that can cope with any shift pattern. That is, the torque sharing ratio of the transmitted torque that makes it possible to incorporate the delivery of the torque during the shift into the equations of motion and find a unique solution to the control operation amounts is set as the condition of constraint. When the total transmitted torque (the summated transmitted torque) that needs to be taken charge of by both the release-side clutch and the engagement-side clutch at the time of the shift of the automatic transmission 3, is replaced with, for example, the torque on the input shaft 3a (the summated transmitted torque on the input shaft), torque sharing ratio is the ratio of the transmitted torque that is taken charge of by each of the frictional engagement elements to the total transmitted torque on the input shaft. In the present embodiment of the disclosure, the torque sharing ratio of the engagement-side clutch is denoted by "x apl", and the torque sharing ratio of the release-side clutch is denoted by "x drn". The torque sharing ratios are defined by equations (3) and (4) shown below respectively, using a torque sharing ratio x (e.g., 0≤x≤1) that changes in a time-series manner such that the delivery of the torque during the shift is reflected.

$$x\ apl = x \quad (3)$$

$$x\ drn = 1-x \quad (4)$$

A relational expression of the engagement-side clutch torque Tcapl and the release-side clutch torque Tcdrn can be defined using "x" (=x apl) and "1−x" (=x drn), based on "Tcapl" and "Tcdrn" replaced with the torques on the input shaft 3a and the foregoing equations (3) and (4). Then, a relational expression for calculating the turbine torque Tt, the engagement-side clutch torque Tcapl, and the release-side clutch torque Tcdrn as the control operation amounts is derived from the foregoing equations (1) and (2) and the relational expression of "Tcapl" and "Tcdrn". The turbine torque Tt (which is synonymous with the engine torque Te) is expressed by a relational expression using "x" (=x apl), "1−x" (=x drn), the input shaft acceleration $d\omega t/dt$, the transmission output torque To and the like. By the same token, the engagement-side clutch torque Tcapl is expressed by a relational expression using "x" (=x apl), the input shaft acceleration $d\omega t/dt$, the transmission output torque To and the like. By the same token, the release-side clutch torque Tcdrn is expressed by a relational expression using "1−x" (=x drn), the input shaft acceleration dωt/dt, the transmission output torque To and the like.

That is, the shift model according to the present embodiment of the disclosure is designed to calculate the control operation amounts based on the shift target values, using the equations of motion of the automatic transmission 3 (the foregoing equations (1) and (2)) including the shift target values and the control operation amounts and the relationship representing the torque sharing ratios (the foregoing equations (3) and (4)). As described hitherto, in the present embodiment of the disclosure, the shift of the automatic transmission 3 is performed through the use of the shift model, by adding the condition of constraint set at the torque sharing ratio x to the foregoing equations (1) and (2). In consequence, even in the case where there are three control operation amounts for two shift target values, the three control operation amounts can be appropriately determined through the use of the shift model. This shift model is a single predetermined model. However, the equations of motion of the gear train in which the constants differ depending on the type of the shift (e.g., the shift pattern or the combination of shift speeds before and after the shift) are used as described previously. Therefore, the shift model corresponding to each shift type is used for the shift of the automatic transmission 3.

Next, a plurality of shift prohibition control as a feature of the present embodiment of the disclosure will be described. The plurality of shift mentioned herein means a shift operation in which a changeover (a transition) in the shift operation to the downshift speed change is made due to, for example, the creation of a downshift speed change requirement during the upshift speed change of the automatic transmission 3.

In the conventional art, if the torque input to the automatic transmission is low at the timing when the downshift speed change is started in the case where a downshift speed change requirement is created during the upshift speed change of the automatic transmission, the input shaft rotational speed cannot be swiftly raised to the synchronous rotational speed at the required shift speed of this downshift speed change, and it may become difficult to progress the downshift speed change. In particular, this situation arises when a requirement for a downshift speed change (hereinafter referred to as a power-on downshift speed change in some cases) is created through the performance of the accelerator depression operation during the inertia phase of an upshift speed change (hereinafter referred to as a power-off upshift speed change in some cases) in the driven state of the vehicle.

In view of this, according to the present embodiment of the disclosure, when the downshift speed change requirement (the power-on downshift speed change requirement) is created through the performance of the accelerator depression operation during the inertia phase of the upshift speed change (the power-off upshift speed change) in the driven state of the vehicle, the plurality of shift for making a transition from the upshift speed change to the downshift speed change is prohibited for the predetermined period (until the predetermined time elapses from the time point when this accelerator depression operation is performed) (a plurality of shift prohibition control). This makes it possible to start the downshift speed change at the time point when the torque input to the automatic transmission 3 becomes sufficiently high as a result of the accelerator depression operation, and swiftly raise the input shaft rotational speed ωi to the synchronous rotational speed at the required shift speed of the downshift speed change.

This a plurality of shift prohibition control is performed by the ECU 5. Therefore, in the ECU 5, a functional unit that performs the plurality of shift prohibition control is configured as the plurality of shift prohibition unit according to the disclosure.

Next, the procedure of a plurality of shift prohibition control according to the present embodiment of the disclosure will be described with reference to a flowchart of FIG. 5. This flowchart is repeatedly executed at intervals of a predetermined time, after a start switch of the vehicle is operated to be turned on. Incidentally, respective flags that will be described later have been reset to 0 at the time point when the start switch is operated to be turned on.

First of all, it is determined in step ST1 whether or not a power-off upshift flag that is stored in advance in the ECU 5 is set to "1". This power-off upshift flag is set to "1" at the time point when a power-off upshift speed change (an upshift speed change in the driven state of the vehicle) is started, and is reset to "0" when the shift is ended.

At the time when the start switch is operated to be turned on, the power upshift flag has been reset to "0". Therefore, the result of the determination in step ST1 is NO, and a transition to step ST2 is made. In this step ST2, it is determined whether or not a requirement for a shift of the automatic transmission 3 is created and this requirement for the shift is a power-off upshift speed change requirement.

In this step ST2, it is determined whether or not the vehicle is in its driven state, through the use of a determination map (not shown) that is set in accordance with the vehicle speed and the accelerator depression amount, or through the use of a determination map (not shown) that is set in accordance with the input shaft rotational speed ωi of the automatic transmission 3 and the transmission input torque Ti of the automatic transmission 3. Alternatively, it may be determined that the vehicle is in its driven state, on the condition that an accelerator-OFF operation (an operation of making the accelerator depression amount equal to "0") is performed. Alternatively, it may be determined that the vehicle is in its driven state, on the condition that the transmission input torque Ti has remained smaller than a predetermined value for a predetermined time. This predetermined value and this predetermined time are set based on an experiment or a simulation.

Besides, it is determined whether or not the requirement for the shift is an upshift speed change requirement, by comparing a required shift speed that is set based on the shift map using the vehicle speed and the accelerator depression amount as parameters with a shift speed at the moment (a current shift speed), and determining whether or not the required shift speed is on a higher gear side (on a smaller speed ratio side) than the current shift speed. Incidentally, the current shift speed is obtained from the speed ratio as a ratio of the rotational speed of the input shaft 3a (the input shaft rotational speed ωi) to the rotational speed of the output shaft 3b (the output shaft rotational speed ωo).

If the requirement for the shift is not a power-off upshift speed change requirement, the result of the determination in step ST2 is NO, it is concluded that there is no situation where a plurality of shift prohibition control should be performed (there is no situation where it should be determined whether to prohibit a plurality of shift or not), and a return is made immediately.

On the other hand, if the result of the determination in step ST2 is YES on the ground that the requirement for the shift is a power-off upshift speed change requirement, a transition to step ST3 is made, and the power-off upshift speed change is started. In this power-off upshift speed change, the input shaft rotational speed ωi is lowered toward a synchronous rotational speed at the shift speed after the upshift speed change (the required shift speed) (an inertia phase) by performing the operation of releasing the frictional engagement element that is engaged at the shift speed before the upshift speed change. After that, a shift operation is performed (an operation of permutating the frictional engagement elements; a torque phase) by performing the operation of releasing this frictional engagement element and the operation of engaging the frictional engagement element that is engaged at the shift speed after the upshift speed change (the required shift speed).

After the power-off upshift speed change is started, a transition to step ST4 is made. The power-off upshift flag is set to "1", and a transition to step ST5 is made.

In step ST5, it is determined whether or not the current upshift speed change is in a shift state during the inertia phase. This determination is made based on a degree of progress of the shift or the like. For example, if it is determined that the inertia phase is started at the time point when the input shaft rotational speed ωi begins to be lowered with respect to the synchronous rotational speed at the shift speed before the upshift speed change and that the inertia phase is ended at the time point when this input shaft rotational speed ωi becomes close to the synchronous rotational speed at the shift speed after the upshift speed change (the required shift speed), it can be determined whether or not the current upshift speed change is in the shift state during the inertia phase, by contrasting this input shaft rotational speed ωi and the synchronous rotational speed with each other. Besides, as for the determination on the start of the inertia phase, it may be determined that the inertia phase is started at the time point when the input shaft acceleration dωt/dt becomes smaller than "0" after the upshift speed change is required. Furthermore, it may be determined that the inertia phase is started at the time when the input shaft rotational speed ωi becomes lower than a rotational speed that is obtained by multiplying the output shaft rotational speed ωo by the gear ratio of the shift speed before the start of the shift (before the start of the upshift speed change).

If the result of the determination in step ST5 is NO on the ground that the current upshift speed change is not in the shift state during the inertia phase (e.g., the inertia phase has not been started yet), a transition to step ST6 is made to determine whether or not the shift has ended. At the time point when the power-off upshift speed change is started, the result of the determination in step ST6 is NO, so a return is made immediately. That is, the return is made based on a conclusion that there is no situation where a plurality of shift prohibition control should be performed.

In the subsequent routine, the result of the determination in step ST1 is YES on the ground that the power-off upshift flag is set to "1" (set to "1" in the foregoing step ST4), and a transition to step ST5 is made. In this step ST5, as described previously, it is determined whether or not the current upshift speed change is in the shift state during the inertia phase.

If the result of the determination in step ST5 is YES on the ground that the inertia phase is started, a transition to step ST7 is made to determine whether or not an accelerator-ON operation has been performed. That is, it is determined whether or not the accelerator depression amount that is calculated based on an output signal of the accelerator depression amount sensor 84 has become equal to or larger than a predetermined value.

If the accelerator-ON operation has not been performed, the result of the determination in step ST7 is NO, and a transition to step ST6 is made. Then, if the shift is ended without performing the accelerator-ON operation, namely, if the shift is ended while continuing the power-off upshift speed change, the result of the determination in step ST6 is YES, and a transition to step ST8 is made. In this case, during the inertia phase, the result of the determination in step ST5 is YES, and the result of the determination in step ST7 is NO. When a transition to the torque phase is made (in a routine subsequent to the transition to the torque phase), the result of the determination in step ST5 is NO. When the shift is ended, the result of the determination in step ST6 is YES, and a transition to step ST8 is made.

In step ST8, the power-off upshift flag is reset to "0", and then, a return is made. In this case, the power-off upshift speed change is ended with no a plurality of shift performed (with no requirement for a plurality of shift (no power-on downshift speed change requirement) created).

If the result of the determination in step ST7 is YES on the ground that the accelerator-ON operation is performed during the power-off upshift speed change, a transition to step ST9 is made to determine whether or not a timer count flag that is stored in advance in the ECU 5 is set to "1". This timer count flag is set to "1" when the counting by a timer that will be described later is started. At the time when the start switch is operated to be turned on, the counting by the timer has not been started yet, so the timer count flag has been reset to "0". Therefore, the result of the determination in step ST9 is NO, and a transition to step ST10 is made.

In step ST10, the counting by the timer is started. The time to the end of the counting by this timer (the duration until the time is up for the timer) is set shorter than, for example, the duration of a general inertia phase.

After the counting by the timer is started in step ST10, a transition to step ST11 is made to set the timer count flag to "1". Then, a transition to step ST12 is made.

In step ST12, it is determined whether or not the accelerator-OFF operation has been performed. That is, it is determined whether or not the accelerator depression amount that is calculated based on an output signal from the accelerator depression amount sensor 84 has become smaller than a predetermined value (e.g., whether or not the accelerator depression amount has become equal to 0).

If the result of the determination in step ST12 is NO on the ground that the accelerator-OFF operation has not been performed, a transition to step ST13 is made to determine whether or not the time is up for the timer.

At the time point when the counting by the timer is started as a result of an accelerator-ON operation, the time is not up for the timer, so the result of the determination in step ST13 is NO, and a transition to step ST14 is made. In this step ST14, a plurality of shift resulting from the accelerator-ON operation is prohibited. That is, even when a power-on downshift speed change requirement is created through the performance of the accelerator-ON operation during the power-off upshift speed change, this power-on downshift speed change is prohibited. Thus, the power-off upshift speed change is continued.

Thus, with the plurality of shift prohibited (with a changeover to the power-on downshift speed change prohibited), the result of the determination in step ST1 is YES on the ground that the power-off upshift flag is set to "1" in the subsequent routine. Then, if the inertia phase is established (the result of the determination in step ST5 is YES) and the accelerator-ON operation has been performed (the result of the determination in step ST7 is YES), the timer counter flag has been set to "1" since the execution of the last routine, so the result of the determination in step ST9 is YES, and a transition to step ST12 is made. In this step ST12, it is determined whether or not the accelerator-OFF operation has been performed as described previously. Then, the plurality of shift remains prohibited (a changeover to the power-on downshift speed change remains prohibited) until the time is up for the timer (until the result of the determination in step ST13 becomes YES), on the condition that the accelerator-OFF operation is not performed in this step ST12 (the result of the determination in step ST12 is NO). That is, when the accelerator-ON operation is performed during the inertia phase of the power-off upshift speed change, the plurality of shift is prohibited during a period before the time is up for the timer that starts counting at the time point when this accelerator-ON operation is performed.

The operation of these steps ST1, ST5, ST7, and ST12 to ST14 is equivalent to the operation of the plurality of shift prohibition unit according to the disclosure (the plurality of shift prohibition unit that prohibits the plurality of shift for making a transition from the upshift speed change to the downshift speed change for the predetermined period, when a downshift speed change requirement is created through the performance of the accelerator depression operation during the inertia phase of the upshift speed change in the driven state of the vehicle).

When the time is up for the timer with the accelerator-ON operation performed due to the continuation of this situation (with the result of the determination in step ST7 being YES), the result of the determination in step ST13 is YES, and a transition to step ST15 is made. In this step ST15, the plurality of shift prohibited in the foregoing step ST14 is permitted. That is, when a power-on downshift speed change requirement is created as a result of the performance of the accelerator-ON operation during the power-off upshift speed change, this power-on downshift speed change is permitted. Thus, the plurality of shift for making a transition from the power-off upshift speed change to the power-on downshift speed change is performed.

After the plurality of shift is thus permitted, a transition to step ST16 is made to reset the respective flags to "0". Then, a return is made.

At the time point when the plurality of shift is thus permitted, the torque input to the automatic transmission 3 is sufficiently high as a result of the accelerator-ON operation. That is, the power-on downshift speed change is started at the time point when the torque input to this automatic transmission 3 becomes sufficiently high. The input shaft rotational speed ωi can be swiftly raised to the synchronous rotational speed at the required shift speed after this power-on downshift speed change.

Besides, if the result of the determination in step ST12 is YES on the ground that the accelerator-OFF operation is performed during the counting by the timer, a transition to step ST17 is made. The counting by the timer is ended since the power-on downshift speed change requirement is regarded as cancelled. Then, the counting by the timer is ended, and the timer count flag is reset to "0" to make a return. In this case, the power-off upshift speed change is continued as a result of the cancellation of the power-on downshift speed change. When this power-off upshift speed change is ended, the result of the determination in step ST6 is YES, and the power-off upshift flag is reset to "0" in step ST8.

Figure 6:
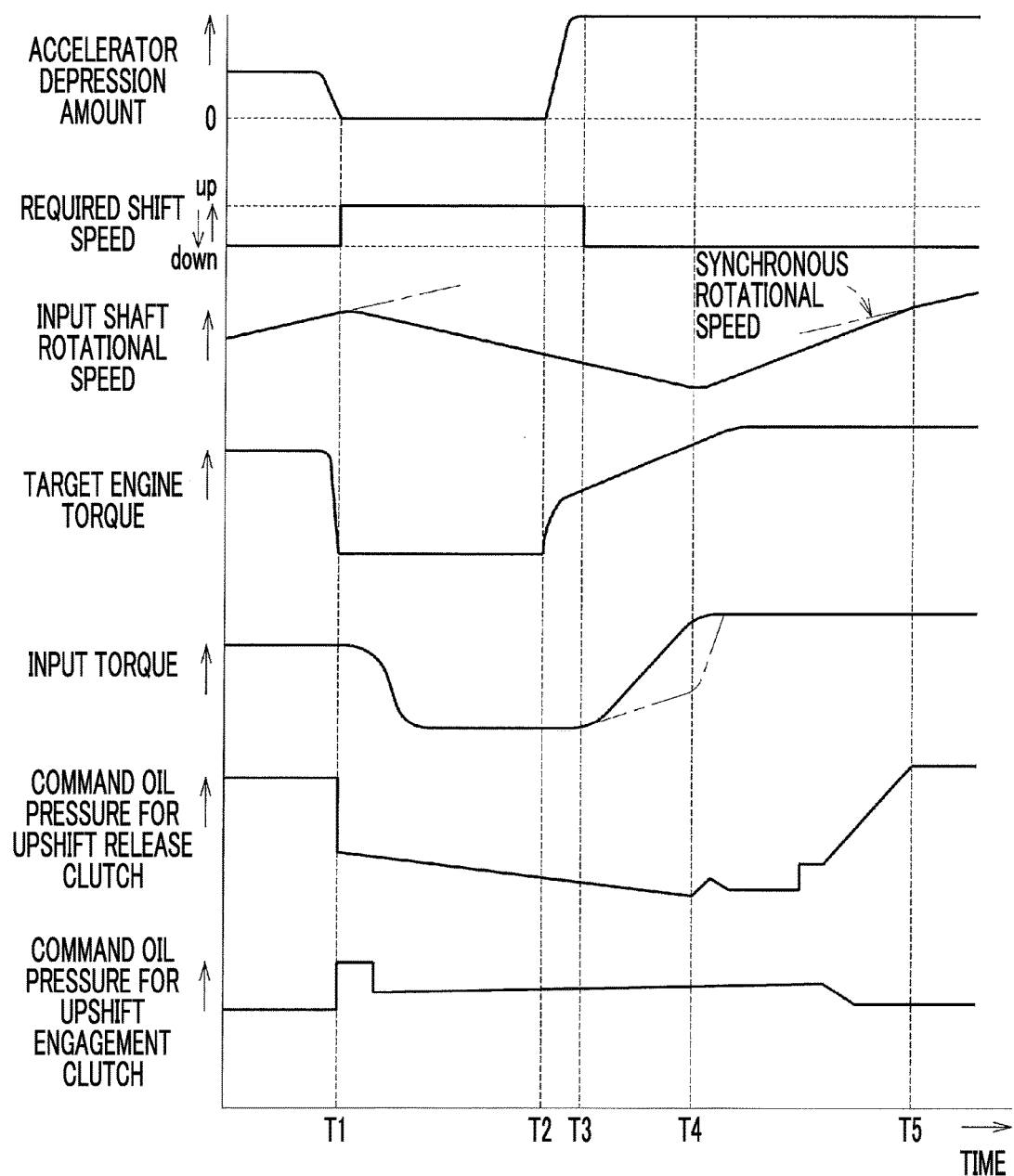
FIG. 6 is a timing chart showing changes in an accelerator depression amount, a required shift speed, an input shaft rotational speed, a target engine torque, an input torque, command oil pressures of the respective clutches in the case where a plurality of shift prohibition control is performed.

FIG. 6 is a timing chart showing changes in the accelerator depression amount, the required shift speed, the input shaft rotational speed, the target engine torque, the input torque, the command oil pressure for the frictional engagement element that is on the release side in the power-off upshift speed change (hereinafter referred to as an upshift release clutch), and the command oil pressure for the frictional engagement element that is on the engagement side in the power-off upshift speed change (hereinafter referred to as an upshift engagement clutch), in the case where a plurality of shift prohibition control is performed.

Figure 5:
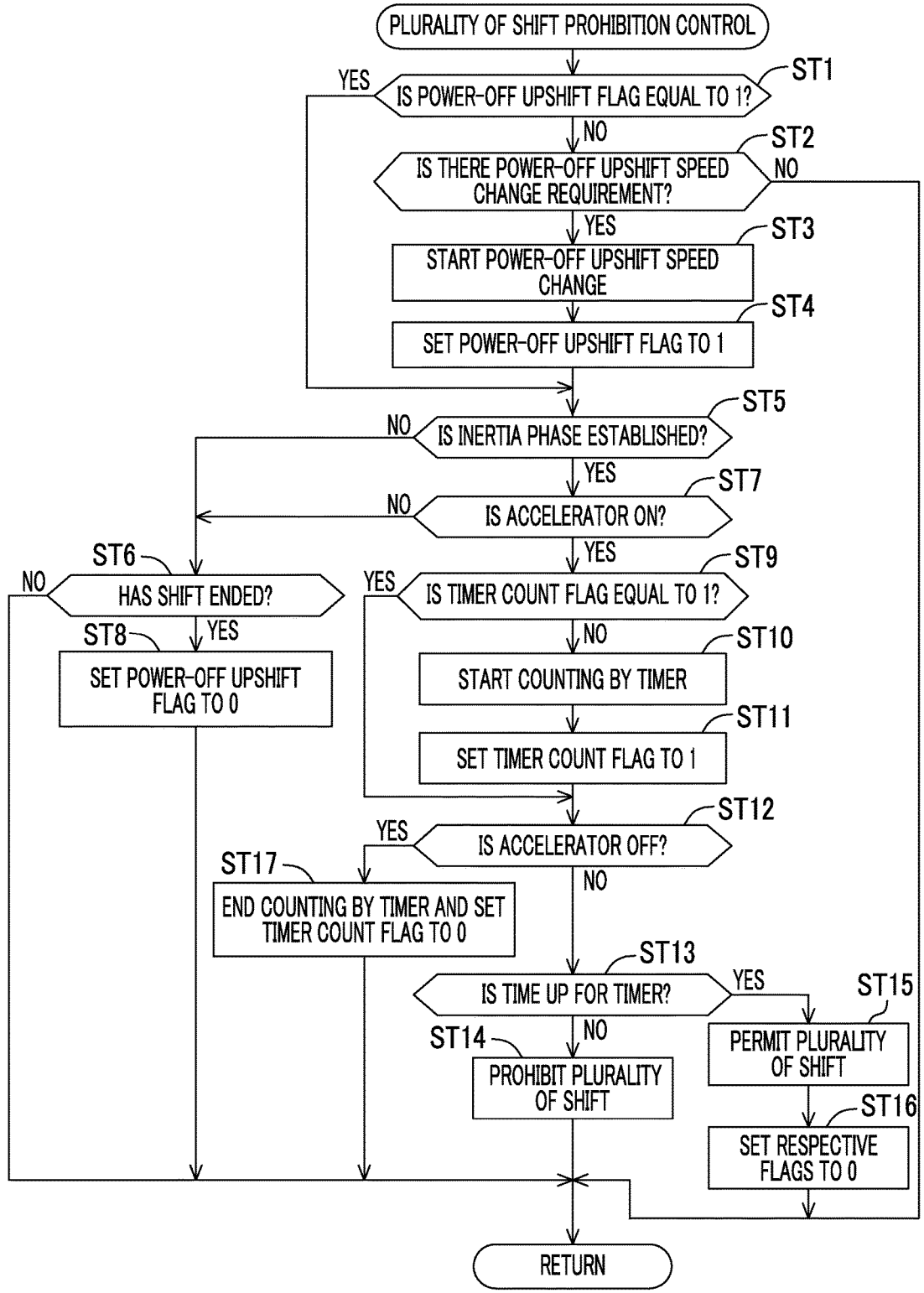
FIG. 5 is a flowchart for illustrating the procedure of a plurality of shift prohibition control.

At a timing T1 in FIG. 6, the accelerator depression amount becomes equal to "0", and a power-off upshift speed change requirement for making a transition of the required shift speed from the current shift speed to a higher gear side is created (the result of the determination in step ST2 is YES in the flowchart of FIG. 5). As a result of this power-off upshift speed change requirement, as the command oil pressure for the upshift release clutch falls, a release operation is started, and the input shaft rotational speed ωi falls (the inertia phase). Besides, at this timing T1, a command for a fast-fill oil pressure is issued as a command oil pressure for the upshift engagement clutch.

Then, at a timing T2 during the power-off upshift speed change, the accelerator-ON operation is started. As a result, the target engine torque rises.

At a timing T3, the accelerator depression amount reaches a predetermined value (the result of the determination in step ST7 is YES in the flowchart of FIG. 5), and a power-on downshift speed change requirement is created. At this timing T3, the inertia phase of the power-off upshift speed change is established although the accelerator-ON operation has been performed, so the plurality of shift is prohibited. The period in which this a plurality of shift is prohibited lasts until a predetermined time elapses after the accelerator-ON operation (the operation of making the accelerator depression amount equal to a predetermined depression amount) is performed. In FIG. 6, this period is a period from the timing T3 to a timing T4. Incidentally, the period in which the plurality of shift is prohibited may be a period from the timing T2 to the timing T4. That is, this period is equivalent to a period from the timing when the counting by the timer is started to the timing when the time is up for the timer.

Then, at the timing T4, the plurality of shift is permitted on the ground that the time is up for the timer (the result of the determination in step ST13 is YES in the flowchart of FIG. 5), the command oil pressure for the upshift release clutch rises, and an engagement operation is started. Besides, the command oil pressure for the upshift engagement clutch is set low on the clutch release side.

At a timing T5, the engagement operation of the upshift release clutch is completed, and the input shaft rotational speed ωi reaches the synchronous rotational speed after the power-on downshift speed change (see an alternate long and short dash line in FIG. 6).

As described above, in the present embodiment of the disclosure, even when the power-on downshift speed change requirement is created through the performance of the accelerator-ON operation during the inertia phase of the power-off upshift speed change (the upshift speed change in the driven state of the vehicle), the plurality of shift (a transition from the power-off upshift speed change to the power-on downshift speed change) is prohibited until the predetermined time elapses from the time point when the accelerator-ON operation is performed. That is, during the predetermined time when the plurality of shift is thus prohibited, the torque input to the automatic transmission 3 rises as a result of the accelerator-ON operation. The power-on downshift speed change is started at the time point when this input torque becomes sufficiently high. Therefore, the input shaft rotational speed ωi can be swiftly raised to the synchronous rotational speed at the required shift speed after the power-on downshift speed change, and the power-on downshift speed change can be smoothly progressed.

Besides, according to the present embodiment of the disclosure, during the predetermined time when the plurality of shift is prohibited, the power-off upshift speed change is continued. Thus, a driving force can be obtained through an inertia torque resulting from this shift. Therefore, it is also possible to enhance the responsiveness of an initial driving force at the time of a transition to the power-on downshift speed change. As a result, good drivability can be realized.

Besides, as another feature of the present embodiment of the disclosure, target driving force smoothing control is performed. This target driving force smoothing control is designed to make the climb gradient of the target driving force smaller when a shift operation is performed upon a transition from the driven state of the vehicle (power-off) to the driving state of the vehicle (power-on) (e.g., when the power-on upshift speed change is performed) than when the same shift operation is performed while maintaining the driving state of the vehicle (with no changeover made between the driven state of the vehicle and the driving state of the vehicle). In more concrete terms, when the shift operation is performed upon a transition from the driven state of the vehicle to the driving state of the vehicle, the value of a turbine torque Tt as an input torque applied to the foregoing equation (2) is subjected to a smoothing process with respect to an actual input torque equivalent to the transmission input torque Ti that is actually input to the input shaft 3a, and the transmission output torque (the shift target value) To that is calculated according to the equation (2) is made small through the use of the turbine torque Tt that has been made equal to a small value. The input torque (the turbine torque Tt) that is applied to this equation (2) will be referred to hereinafter as a computation input torque.

This target driving force smoothing control is performed by the ECU 5. Therefore, in the ECU 5, a functional unit that performs the target driving force smoothing control is configured as the smoothing process unit according to the disclosure.

Next, the procedure of target driving force smoothing control according to the present embodiment of the disclosure will be described with reference to flowcharts of FIGS. 7 and 8. Each of these flowcharts is also repeatedly executed at intervals of a predetermined time after the start switch of the vehicle is operated to be turned on.

First of all in step ST21, it is determined whether or not a rattling region determination flag that is stored in advance in the ECU 5 is set to "1". This rattling region determination flag is set to "1" when it is determined that the play of the automatic transmission 3 (e.g., the backlash between gears) is shortened in the direction opposite to the case of the driving state of the vehicle, upon the establishment of the driven state of the vehicle.

The rattling region determination flag has been reset to "0" at the time point when the start switch is operated to be turned on. Therefore, the result of the determination in step ST21 is NO, and a transition to step ST22 is made. In this step ST22, it is determined whether or not the torque actually input to the automatic transmission 3 has fallen to become lower than a rattling region determination threshold set in advance. For example, when the driven state of the vehicle is established through the accelerator-OFF operation, the actual input torque falls to become lower than the rattling region determination threshold. Incidentally, the actual input torque is obtained from a map or computation formula that is stored in advance in the ECU 5, based on an operating state of the engine 1 or the like.

If the result of the determination in step ST22 is YES on the ground that the torque actually input to the automatic transmission 3 has fallen to become lower than the rattling region determination threshold, a transition to step ST23 is made to determine whether or not a driven state determination timer count flag that is stored in advance in the ECU 5 is set to "1". When the start switch is operated to be turned on, the driven state determination timer count flag has been reset to "0". Therefore, the result of the determination in step ST23 is NO, and a transition to step ST24 is made.

In step ST24, the counting by a driven state determination timer is started. This driven state determination timer prescribes a time for determining whether or not the vehicle is in its driven state. The time is up for this counter upon the lapse of a predetermined time after the start of the counting. That is, it is determined that the vehicle is in its driven state, when the actual input torque has remained lower than the rattling region determination threshold until the timing when the time is up for this driven state determination timer.

After the start of the counting by this driven state determination timer, a transition to step ST25 is made to set the driven state determination timer count flag to "1". Then, a transition to step ST26 is made.

In step ST26, it is determined whether or not the time is up for the driven state determination timer. At the time point when the counting by the driven state determination timer is started, the time is not up yet. Therefore, the result of the determination in step ST26 is NO, and a return is made.

In the subsequent routine, if the actual input torque is still lower than the rattling region determination threshold, the result of the determination in step ST22 is YES. The result of the determination in step ST23 is YES, and a transition to step ST26 is made, because the driven state determination timer count flag has been set to "1" since the execution of the last routine (the driven state determination timer count flag is set to "1" in the foregoing step ST25). As described previously, it is determined in this step ST26 whether or not the time is up for the driven state determination timer.

If the actual input torque has become equal to or higher than the rattling region determination threshold before the time is up for the driven state determination timer, the result of the determination in step ST22 is NO. In step ST27, the driven state determination timer count flag is reset to "0", and a return is made. That is, since the driving state of the vehicle is established, the determination on the driven state by the driven state determination timer is ended.

When the time is up for the driven state determination timer due to the continuation of the state where the actual input torque is lower than the rattling region determination threshold, the result of the determination in step ST26 is YES, and a transition to step ST28 is made. In this step ST28, the driven state determination timer count flag is reset to "0", the rattling region determination flag is set to "1", and a transition to step ST29 is made.

In step ST29, it is determined whether or not the actual input torque has reached a value that is equal to or higher than the rattling region determination threshold. For example, when the driving state of the vehicle is established through the accelerator-ON operation, the actual input torque reaches a value that is equal to or higher than the rattling region determination threshold.

If the result of the determination in step ST29 is NO on the ground that the actual input torque has not reached a value that is equal to or higher than the rattling region determination threshold, it is concluded that there is still no situation where target driving force smoothing control should be performed, and a return is made.

Then, if the result of the determination in step ST29 is YES on the ground that the actual input torque has reached a value that is equal to or higher than the rattling region determination threshold, a transition to step ST30 is made to start a target driving force smoothing process and set an input torque value limitation execution flag that is stored in advance in the ECU 5 to "1". This input torque value limitation execution flag is set to "1" during a period in which the control operation of making the calculated transmission output torque (the shift target value) To small by making the turbine torque Tt that is applied to the foregoing equation (2) small (small as the computation input torque) is performed.

In this target driving force smoothing process, as described previously, the value of the turbine torque Tt as the input torque that is applied to the foregoing equation (2) is subjected to the smoothing process, with respect to the actual input torque equivalent to the transmission input torque Ti that is actually input to the input shaft 3a, and the transmission output torque (the shift target value) To that is calculated according to the equation (2) is made small through the use of the turbine torque (the computation input torque) Tt that has been made small. Thus, the climb gradient of the target driving force is made smaller than when the same shift operation is performed with the driving state of the vehicle maintained. For example, the control of the engagement-side clutch torque Tcapl and the release-side clutch torque Tcdrn is performed such that this transmission output torque To becomes low. For example, the control of making the gradients of changes in these clutch torques Tcapl and Tcdrn small is performed. Besides, operation control of the engine 1 may be performed such that the output torque of the engine 1 becomes low.

After the target driving force smoothing process is thus started, a transition to step ST31 is made to start the counting by a driving state determination timer. This driving state determination timer is designed to subject the value of the turbine torque Tt as the input torque that is applied to the foregoing equation (2) to the smoothing process, and prescribe the period in which the transmission output torque (the shift target value) To that is calculated according to the equation (2) is made low, through the use of the turbine torque (the computation input torque) Tt that has been made low. The period to the timing when the time is up for the driving state determination timer is appropriately set based on an experiment or a simulation.

After the counting by this driving state determination timer is started, a transition to step ST32 is made to determine whether or not the time is up for the driving state determination timer. When the counting by the driving state determination timer is started, the time is not up yet. Therefore, the result of the determination in step ST32 is NO, and the target driving force smoothing process is continued.

Then, when the time is up for the driving state determination timer, the result of the determination in step ST32 is YES, and a transition to step ST33 is made to end the target driving force smoothing process. After that, a transition to step ST34 is made to reset the rattling region determination flag to "0".

After that, a transition to step ST35 is made to start a computation input torque raising process for making the input torque (the computation input torque) applied to the equation (2) as a low value as described previously close to the actual input torque. This process changes the smoothing coefficient by which the actual input torque is multiplied to calculate the computation input torque, and thereby ensures that the computation input torque rapidly approaches the actual input torque. Besides, the amount of rise in the computation input torque per unit time in this computation input torque raising process is set as a value that allows the frequency of oscillation of the automatic transmission 3 resulting from changes in the transmission output torque (the shift target value) To to pass the resonance frequency band of a motive power transmission system within a predetermined time.

After this computation input torque raising process is started, a transition to step ST36 is made to determine whether or not the computation input torque has coincided with the actual input torque. If the computation input torque has coincided with the actual input torque, the result of the determination in step ST36 is YES, and a transition to step ST37 is made to reset the input torque value limitation execution flag to "0".

FIG. 9 is a timing chart showing changes in the accelerator depression amount, the rattling region determination flag, the input torque value limitation execution flag, and the input torques (the actual input torque and the computation input torque) in the case where target driving force smoothing control is performed.

At a timing T11 in FIG. 9, the torque actually input to the automatic transmission 3 falls to become lower than the rattling region determination threshold. At this time point, the counting by the driven state determination timer is started (the result of the determination in step ST22 is YES, and the counting by the driven state determination timer is started in step ST24, in the flowchart of FIG. 7). Then, at a timing T12, the counting by the driven state determination timer is ended, and the rattling region determination flag is set to "1" (the result of the determination in step ST26 is YES, and the rattling region determination flag is set to "1", in the flowchart of FIG. 7).

Figure 7:
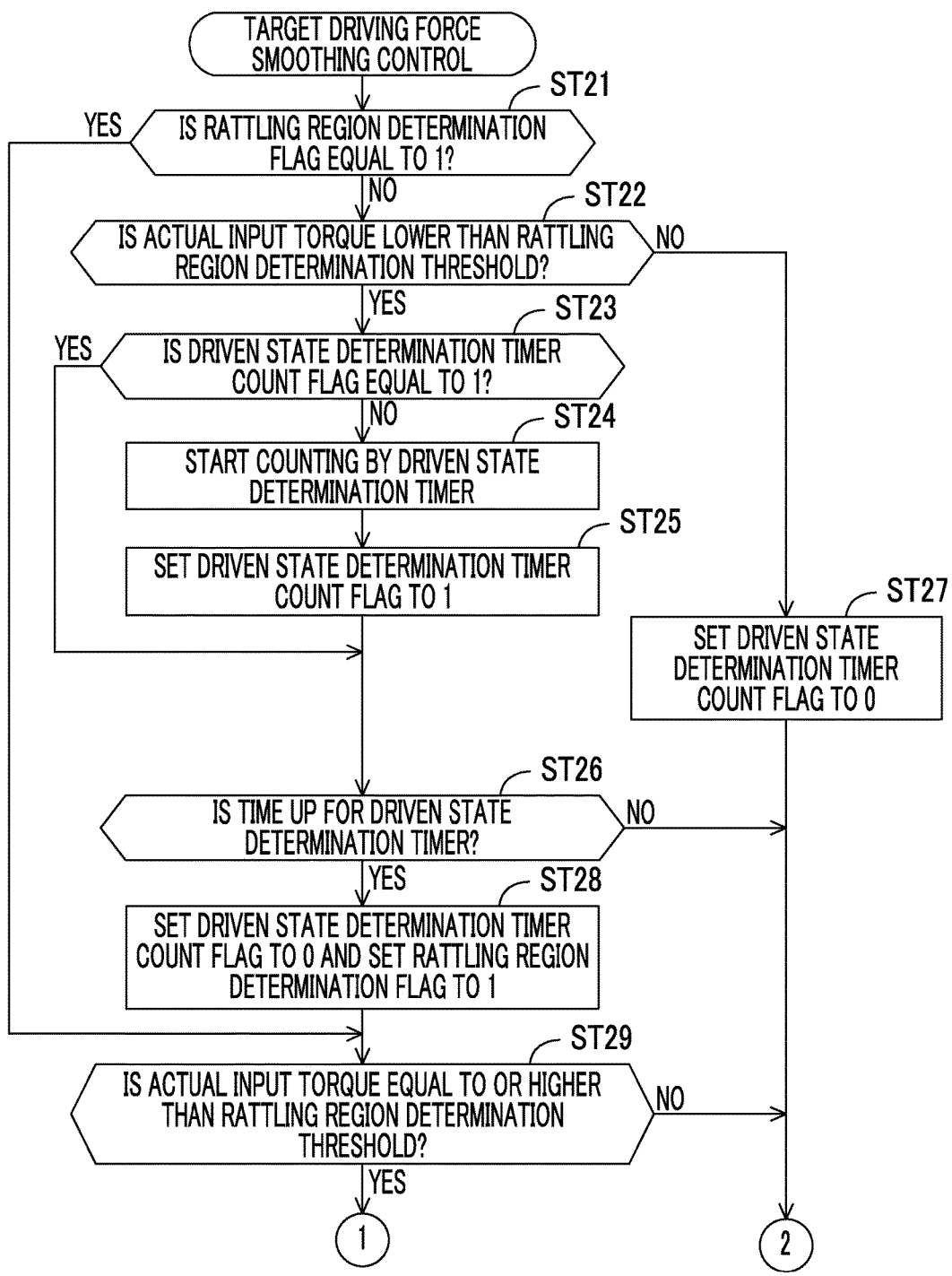
FIG. 7 is a flowchart for illustrating a part of the procedure of target driving force smoothing control.

At a timing T13, the actual input torque reaches a value that is equal to or higher than the rattling region determination threshold, and the input torque value limitation execution flag is set to "1" (the result of the determination in step ST29 is YES, and the input torque value limitation execution flag is set to "1", in the flowchart of FIG. 7).

Figure 8:
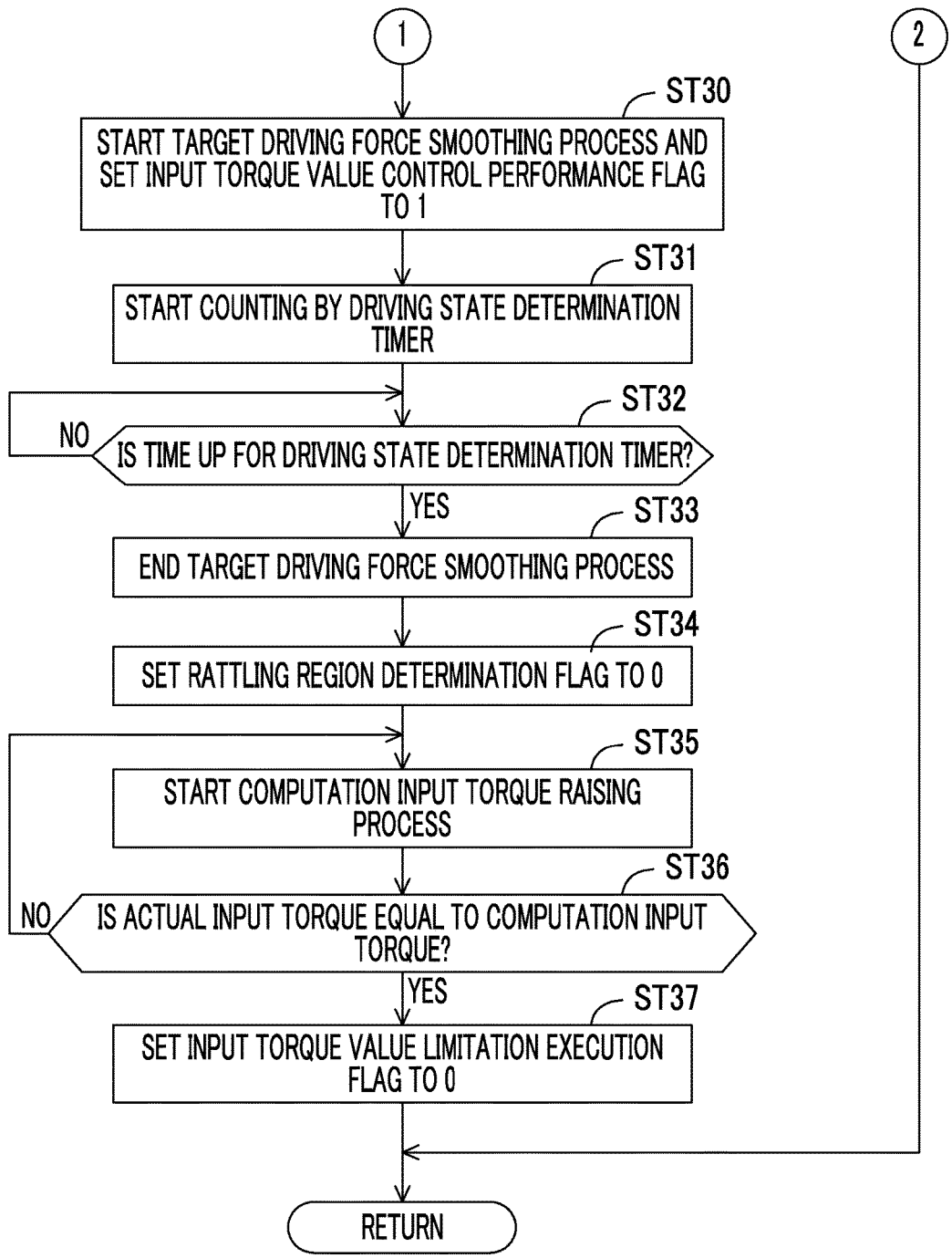
FIG. 8 is a flowchart for illustrating the other part of the procedure of target driving force smoothing control.

At this time point, the target driving force smoothing process in which the computation input torque indicated by an alternate long and short dash line in the drawing is used is started (step ST30 in the flowchart of FIG. 8).

Besides, at a timing T14, the rattling region determination flag is reset to "0" as a result of the end of the counting by the driving state determination timer (step ST34 in the flowchart of FIG. 8).

Then, because the computation input torque raising process is started at the timing T14 and the computation input torque coincides with the actual input torque at a timing T15, the computation input torque raising process is ended, and the input torque value limitation execution flag is reset to "0" (step ST37 in the flowchart of FIG. 8).

As described above, when a changeover from the driven state of the vehicle to the driving state of the vehicle is made, target driving force smoothing control according to the present embodiment of the disclosure makes it possible to alleviate a rattling shock resulting from the shortening of the play (e.g., the backlash between the gears) in the motive power transmission system of the automatic transmission 3 in the opposite direction, and realize good drivability.

Incidentally, the embodiment of the disclosure disclosed herein is exemplary in all respects, and does not constitute any ground for limited interpretation. Accordingly, the technical scope of the disclosure is not interpreted only by the foregoing embodiment thereof, but is defined based on what is described in the claims. Besides, the technical scope of the disclosure encompasses all the alterations that are equivalent in significance and scope to the claims.

For example, the foregoing embodiment of the disclosure presents an example in which the vehicle 100 is an FF vehicle, but the disclosure is not limited thereto. The vehicle may be a front-engine rear-drive (FR) vehicle, or a four-wheel-drive vehicle.

Besides, in the foregoing embodiment of the disclosure, the predetermined period (the period in which the plurality of shift is prohibited) is a period to the lapse of the predetermined time from the timing when the accelerator depression operation is performed, but the disclosure is not limited thereto. The period to the timing when the torque input to the automatic transmission 3 becomes equal to or higher than a predetermined value through the accelerator depression operation may be prescribed as the predetermined period (the period in which the plurality of shift is prohibited). In this manner as well, the input shaft rotational speed ωi can be swiftly raised to the synchronous rotational speed at the required shift speed after the power-on downshift speed change, and the power-on downshift speed change can be smoothly progressed.

Besides, according to the target driving force smoothing control, the computation input torque is made to gradually approach the actual input torque, in the computation input torque raising process, but the disclosure is not limited thereto. The computation input torque may be immediately made to coincide with the actual input torque after the end of the shift.

Besides, the target driving force smoothing control may be performed not only when the power-on upshift speed change is performed from the driven state of the vehicle but also when the power-on downshift speed change is performed from the driven state of the vehicle (the alternate long and short dash line indicating the input torque in FIG. 6 represents the computation input torque in this case).

The disclosure can be utilized for a control apparatus that is applied to a stepped automatic transmission that is mounted on a vehicle and that can perform a plurality of shift when a power-on downshift speed change requirement is created during a power-off upshift speed change.

What is claimed is:

1. A control apparatus for a stepped automatic transmission in which one of a plurality of shift speeds is established by selectively engaging a plurality of frictional engagement elements, the stepped automatic transmission mounted on a vehicle, the control apparatus comprising:
   an electronic control unit configured to perform a control of prohibiting a plurality of shift that is transitioning from an upshift speed change to a downshift speed change, for a predetermined period, when a downshift speed change requirement is requested by an occurrence of an accelerator depression operation during an inertia phase of the upshift speed change in a driven state of a vehicle,
   wherein the electronic control unit is configured to execute a smoothing process such that a climb gradient of a target driving force of the automatic transmission when a shift operation is performed while a driving state of the vehicle transitioning from the driven state of the vehicle to the driving state of the vehicle is smaller than a climb gradient of a target driving force of the automatic transmission when the same shift operation is performed while a driving state of the vehicle maintains the driving state of the vehicle.

2. The control apparatus according to claim 1, wherein the predetermined period is a period to lapse of a predetermined time from a time point when the accelerator depression operation is performed.

3. A control apparatus for a stepped automatic transmission in which one of a plurality of shift speeds is established by selectively engaging a plurality of frictional engagement elements, the stepped automatic transmission mounted on a vehicle, the control apparatus comprising:
   an electronic control unit configured to perform a control of prohibiting a plurality of shift that is transitioning from an upshift speed change to a downshift speed change, for a predetermined period, when a downshift speed change requirement is requested by an occurrence of an accelerator depression operation during an inertia phase of the upshift speed change in a driven state of a vehicle, wherein an end of the predetermined period is a timing when a torque input to the automatic transmission becomes equal to or higher than a predetermined value through the accelerator depression operation.

4. A control method for a control apparatus for a stepped automatic transmission in which one of a plurality of shift speeds is established by selectively engaging a plurality of frictional engagement elements,
   the control apparatus including an electronic control unit, the control method comprising:
   i) determining, by the electronic control unit, whether or not a shift requirement is an upshift requirement;
   ii) determining, by the electronic control unit, whether or not a current upshift speed change is performed in a shift state during an inertia phase; and
   iii) performing, by the electronic control unit, a control of prohibiting a plurality of shift that is transitioning from an upshift speed change to a downshift speed change, for a predetermined period, when a downshift speed change requirement is requested by an occurrence of an accelerator depression operation during an inertia phase of the upshift speed change in a driven state of a vehicle,
   wherein an end of the predetermined period is a timing when a torque input to the automatic transmission becomes equal to or higher than a predetermined value through the accelerator depression operation.

* * * * *